US008670408B2

(12) United States Patent
Lu et al.

(10) Patent No.: US 8,670,408 B2
(45) Date of Patent: Mar. 11, 2014

(54) METHOD AND SYSTEM FOR ASSOCIATION IN RELAY NETWORK

(75) Inventors: Yanling Lu, Shenzhen (CN); Ting Li, Shenzhen (CN); Liangliang Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1567 days.

(21) Appl. No.: 12/036,981

(22) Filed: Feb. 25, 2008

(65) Prior Publication Data

US 2008/0205325 A1   Aug. 28, 2008

(30) Foreign Application Priority Data

Feb. 27, 2007   (CN) .......................... 2007 1 0084290
Oct. 9, 2007   (CN) ................. PCT/CN2007/070853

(51) Int. Cl.
*H04W 4/00* (2009.01)
(52) U.S. Cl.
USPC .......................................................... 370/331
(58) Field of Classification Search
None
See application file for complete search history.

(56) References Cited

U.S. PATENT DOCUMENTS

| 8,175,600 B2 * | 5/2012 | Subramanian et al. ....... 455/436 |
| 2003/0080902 A1 | 5/2003 | Roberts |
| 2004/0058679 A1 | 3/2004 | Dillinger et al. |
| 2006/0079235 A1 | 4/2006 | Kim |
| 2007/0291698 A1 * | 12/2007 | Lee et al. ....................... 370/331 |
| 2008/0031182 A1 * | 2/2008 | Maheshwari et al. ......... 370/320 |
| 2008/0107075 A1 * | 5/2008 | Ramachandran et al. ..... 370/331 |
| 2009/0262718 A1 * | 10/2009 | Meier et al. ................... 370/338 |

FOREIGN PATENT DOCUMENTS

| CN | 1703028 A | 11/2005 |
| CN | 1881965 A | 12/2006 |
| CN | 1883220 A | 12/2006 |
| CN | 1988411 A | 6/2007 |
| CN | 101257704 B | 7/2010 |
| GB | 2357397 A | 12/1999 |

OTHER PUBLICATIONS

1st Office Action in corresponding Chinese Application No. 200780000300.8 (Aug. 12, 2010).
Written Opinion of the International Searching Authority in corresponding PCT Application No. PCT/CN2007/070853 (Jan. 17, 2008).

(Continued)

*Primary Examiner* — Otis L Thompson, Jr.
*Assistant Examiner* — Amar Persaud
(74) *Attorney, Agent, or Firm* — Leydig, Voit & Mayer, Ltd.

(57) ABSTRACT

A method and system for association in a relay network are disclosed; a neighbor Base Station (BS) receives a ranging request from an associated neighbor station and the ranging request is received by the associated neighbor station from an MS; the neighbor BS sends a ranging response to the MS in response to the ranging request; the associated neighbor station is an RS. Association Level 1 is implemented. Another method and system for association in a relay system are disclosed; a neighbor BS receives a ranging report from an associated neighbor station after the associated neighbor station receives a CDMA code from an MS; the neighbor BS sends the ranging report to the MS or to a serving BS by which the ranging report is sent to the MS; the associated neighbor station is an RS. Association Level 2 is implemented.

13 Claims, 7 Drawing Sheets

(56) References Cited

OTHER PUBLICATIONS

International Search Report in corresponding PCT Application No. PCT/CN2007/070853 (Apr. 2007).

"Std. 802-16e-2005—Part 16: Air Interface for Fixed and Mobile Broadband Wireless Access Systems; Amendment 2: Physical and Medium Access Control Layers for Combined Fixed and Mobile Operation in Licensed Bands; and Corrigendum 1," IEEE Computer Society and the IEEE Microwave Theory and Techniques Society, Feb. 28, 2006, Institute of Electrical and Electronics Engineers, Inc., New York, New York.

"P802.16-REVd/D5-2004 Draft—Part 16: Air Interface for Fixed Broadband Wireless Access Systems," IEEE Computer Society and the IEEE Microwave Theory and Techniques Society, May 13, 2004, Institute of Electrical and Electronics Engineers, Inc., New York, New York.

"802.16—IEEE Standard for Local and Metropolitan Area Networks: Media Access Control (MAC) Bridges; Amendment 5: Bridging of IEEE 802.16," IEEE Standard, Aug. 14, 2007, IEEE, New York, New York.

* cited by examiner

METHOD AND SYSTEM FOR ASSOCIATION IN RELAY NETWORK

CROSS-REFERENCE TO RELATED APPLICATIONS

This application claims priority to Chinese Patent Application No. 200710084290.2, filed Feb. 27, 2007, and International Patent Application No. PCT/CN2007/070853, filed Oct. 9, 2007, both of which are hereby incorporated by reference.

FIELD OF THE INVENTION

The disclosure relates to radio communication technologies, and more particularly, to methods and systems for association in a relay network.

BACKGROUND OF THE INVENTION

Association is an optional initial ranging procedure occurring during scanning interval with respect to one of the neighbor Base Stations (BSs). The function of association is to enable the Mobile Station (MS) to acquire and record ranging parameters and service availability information for the purpose of proper selection of Handover (HO) target and/or expediting a potential future HO to a target BS.

There are three levels of association: Association Level 0, Association Level 1 and Association Level 2. Association Level 1 and Association Level 2 are mainly related in the following.

Before performing association, if the serving BS decides to recommend that the MS scan neighbor BSs with Association Level 1 or Association Level 2, it should first request association ranging information to the requested neighbor stations, i.e. an association parameter negotiation is needed. If the requested neighbor station can provide enough resource during the association parameter negotiation procedure, the MS will be allocated the association parameters including rendezvous time, CDMA code, and transmission opportunity offset. If there is no enough resource allocated, the MS may perform the Association Level 0 and then the association ranging parameters can not be allocated.

In Association Level 1 or Level 2, each neighbor BS to be associated by the MS pre-allocates a unique initial CDMA code and a transmission opportunity offset for the MS, and sends the unique initial CDMA code and the transmission opportunity offset to the serving BS via a backbone network. The serving BS coordinates to assure that the neighbor BSs do not overlap in ranging regions or too close in transmission times. The rendezvous time is a frame offset value which equals the difference between the frame number for the recommended association neighbor BS providing the MS with the dedicated ranging transmission opportunity and the frame number for the serving BS sending an MOB_SCN-RSP message.

The association parameters obtained during association parameter negotiation procedure are provided for the MS by the serving BS via the MOB_SCN-RSP message. In a multi-hop radio relay communication system, an MS may access a Relay Station (RS) to enter the network, i.e. the associated neighbor station may be an RS. However, there is no association method for the associated neighbor station being an RS in the prior art. In addition, if the associated RS can schedule the association parameters independently, the serving BS of the associated RS may not acquire the association parameters of the associated RS. In this case, the association parameter negotiation via the backbone network in the prior art can not satisfy the requirements of Association Level 1 and Association Level 2.

SUMMARY OF THE INVENTION

Embodiments of the present invention provide methods and systems for association in a relay network, so that a multi-hop wireless relay network can support Association Level 1 and Association Level 2.

A method for association in a relay network, includes:
receiving, by a serving BS of an associated neighbor station, a ranging request from the associated neighbor station, wherein the ranging request is received by the associated neighbor station from a Mobile Station (MS);
sending, by the serving BS of the associated neighbor station, a ranging response to one of the MS and the associated neighbor station in response to the ranging request;
the associated neighbor station is a Relay Station (RS).

Another method for association in a relay network, includes:
receiving, by a serving Base Station (BS) of an associated neighbor station, a ranging report from the associated neighbor station, after the associated neighbor station receiving a CDMA code from an MS;
if the serving BS of the associated neighbor station is a serving BS of the MS, sending, by the serving BS of the associated neighbor station, the ranging report to the MS;
if the serving BS of the associated neighbor station is a neighbor BS of the MS, sending, by the serving BS of the associated neighbor station, the ranging report to the serving BS of the MS by which the ranging report is sent to the MS;
the associated neighbor station is an RS.

A system for association in a relay network includes:
an associated neighbor station, configured to receive a ranging request, and send the ranging request; wherein the associated neighbor station is an RS;
a serving BS of the associated neighbor station, configured to receive the ranging request from the associated neighbor station, and send a ranging response to an MS or the associated neighbor station; and
the MS, configured to send the ranging request to the associated neighbor station, and receive the ranging response from the serving BS of the associated neighbor station or the associated neighbor station.

A Relay Station (RS) includes:
a ranging request transceiver unit, configured to receive a ranging request from a Mobile Station (MS), and send the ranging request to a serving BS of the RS, receive a ranging response from the serving BS of the RS, and send the ranging response to the MS; and
a parameter negotiation unit, configured to receive an association request sent by the serving BS of the RS, and return an association response to the serving BS of the RS.

Another Relay Station (RS) includes:
a ranging information report unit, configured to receive a CDMA code from an MS, and report the ranging information of the CDMA code to the serving BS of the RS; and
a first ranging request transceiver unit, configured to receive a ranging request message from the MS, and send the ranging request to the serving BS of the RS.

Another association system in a relay network includes:
an associated neighbor station, configured to receive a CDMA code, and send a ranging report; the associated neighbor station is a Relay Station (RS)
a serving BS of the associated neighbor station, configured to receive the ranging report from the associated neighbor station, send the ranging report to an MS if the serving BS of the associated neighbor station is a serving BS of the MS; or send the ranging report to the MS via the serving BS of the MS if the serving BS of the associated neighbor station is a neighbor BS of the MS; and the MS, configured to send the CDMA code to the associated neighbor station, and receive the ranging report sent by the serving BS of the MS.

A Mobile Station (MS) is configured to send a ranging request to an associated neighbor station, and receive a ranging response from one of the serving BS of the associated neighbor station and the associated neighbor station.

A method for negotiation for association in a relay network, includes:

sending, by a serving BS of a neighbor station, an association request to the neighbor station; and receiving, by the serving BS of the neighbor station, an association response from the neighbor station;

the associated neighbor station is an RS.

As can be seen from the above technical solution, the method, system, relay station and mobile station for association in relay network provided by embodiments of the present invention can support Association level 1 and Association level 2 when the associated neighbor station is an RS.

BRIEF DESCRIPTION OF THE DRAWINGS

FIG. 3(a) illustrates a flowchart of another method for Association Level 2 in a relay network in accordance with Embodiment 3 of the present invention;

DETAILED DESCRIPTION OF THE INVENTION

Figure 1:
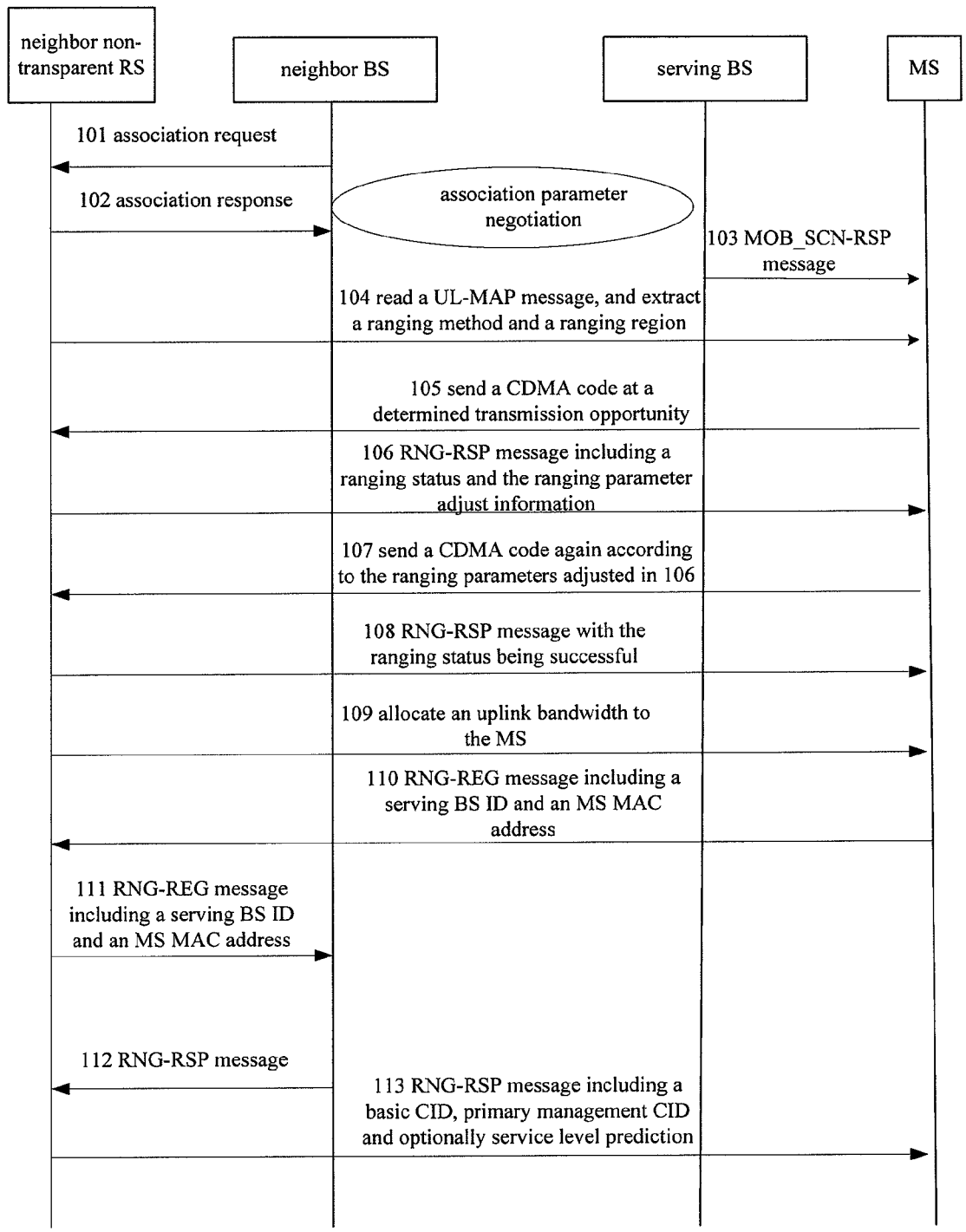
FIG. 1(a) illustrates a flowchart of a method for Association Level 1 in a relay network in accordance with Embodiment 1 of the present invention.
FIG. 1(b) illustrates a flowchart of another method for Association Level 1 in a relay network in accordance with Embodiment 1 of the present invention.

Detailed description is given as follows with respect to embodiments and the accompanying drawings to make the technical solution and merit of the present invention clearer.

There are two scheduling modes, centralized scheduling mode and distributed scheduling mode, in a multi-hop relay network. In the centralized scheduling mode, all bandwidth allocations are determined by a Base Station (BS). In the distributed scheduling mode, a BS or a non-transparent RS determines the bandwidth allocations for the MS or RS communicating with the BS or the non-transparent RS through a radio link. A non-transparent RS can generate downlink broadcast messages independently. A transparent RS can not generate downlink broadcast messages independently.

In the distributed scheduling mode, a serving BS of a non-transparent RS can not timely obtain the whole channel resource scheduling information determined by the non-transparent RS. The serving BS of the non-transparent RS needs to enquire to acquire the channel resource scheduling information determined by the non-transparent RS.

The association of multi-hop relay network may also be categorized as three levels, Association Level 0, Association Level 1 and Association Level 2. In the association, when the serving BS of an MS decided to recommend that the MS scans neighbor stations with Association Level 1 or Association Level 2, an association parameter negotiation procedure is initiated.

After the association parameter negotiation procedure, the MS scans the neighbor stations with the recommended association level. The MS may perform Association Level 0, 1 or 2.

When Association Level 0 is chosen, the MS performs the contention-based ranging at the neighbor station, which is similar to the initial ranging process performed by the MS initially entering the network in the prior art, and will not be detailed.

The method for Association Level 1 according to an embodiment of the present invention is as follows.

An associated neighbor station receives a ranging request from an MS, and sends the ranging request to a serving BS of the associated neighbor station;

the serving BS of the associated neighbor station receives the ranging request, and sends a ranging response to the MS or the associated neighbor station.

If the associated neighbor station is a transparent RS, the ranging response is sent by the serving BS of the associated neighbor station to the MS.

If the associated neighbor station is a non-transparent RS, the ranging response is sent by the serving BS of the associated neighbor station to the associated neighbor station. In this case, the method further includes: the associated neighbor station sending the ranging response from the serving BS of the associated neighbor station to the MS.

When the serving BS of the associated neighbor station is a neighbor BS of the MS, before the associated neighbor station receives a ranging request, the method further includes:

the associated neighbor station performing the association parameter negotiation with the neighbor BS of the MS; the neighbor BS of the MS sending the association parameters negotiated to the serving BS of the MS; the serving BS of the MS sending the association parameters to the MS;

the MS receiving the association parameters and sending a CDMA code included in the association parameters to the associated neighbor station;

the associated neighbor station receiving the CDMA code that requires no corrections from the MS and allocating an uplink (UL) bandwidth to the MS for the MS to send the ranging request;

the MS receiving the UL bandwidth allocated to the MS, sending the ranging request to the associated neighbor station.

When the serving BS of the associated neighbor station is a serving BS of the MS, before the associated neighbor station receives the ranging request, the method further includes:

the associated neighbor station performing association parameter negotiation with the serving BS of the MS; the serving BS of the MS sending the association parameters to the MS;

the MS sending a CDMA code included in the association parameters to the associated neighbor station;

the associated neighbor station receiving the CDMA code that requires no corrections from the MS and allocating an uplink bandwidth to the MS for the MS sending a ranging request;

the MS receiving the uplink bandwidth allocated to the MS, and sending the ranging request to the associated neighbor station.

It should be noted that, the serving BS of the associated neighbor station may be a serving BS or a neighbor BS of MS. There may be multiple associated neighbor stations during one association process. The serving BSs of some associated neighbor stations may be the serving BSs of the MSs, and the serving BSs of the rest associated neighbor stations may be the neighbor BSs of the MSs.

FIG. 1(a) illustrates a flowchart of a method for Association Level 1 in a relay network in accordance with Embodiment 1 of the present invention. In this procedure, the associated neighbor station is a non-transparent RS; the serving BS of the associated neighbor station is a neighbor BS of the MS; the serving BS in this embodiment is the serving BS of the MS. The procedure is as follows.

In 101, a neighbor BS sends an association request to the associated neighbor station; the association request includes an MS identifier and a requested association level.

In this embodiment, the neighbor BS is the neighbor BS of the MS, and the neighbor BS of the MS is the serving BS of the associated neighbor station.

If the associated neighbor station is a BS, the association parameter negotiation procedure is similar to that in the prior art, which will not be detailed.

Figure 1B:
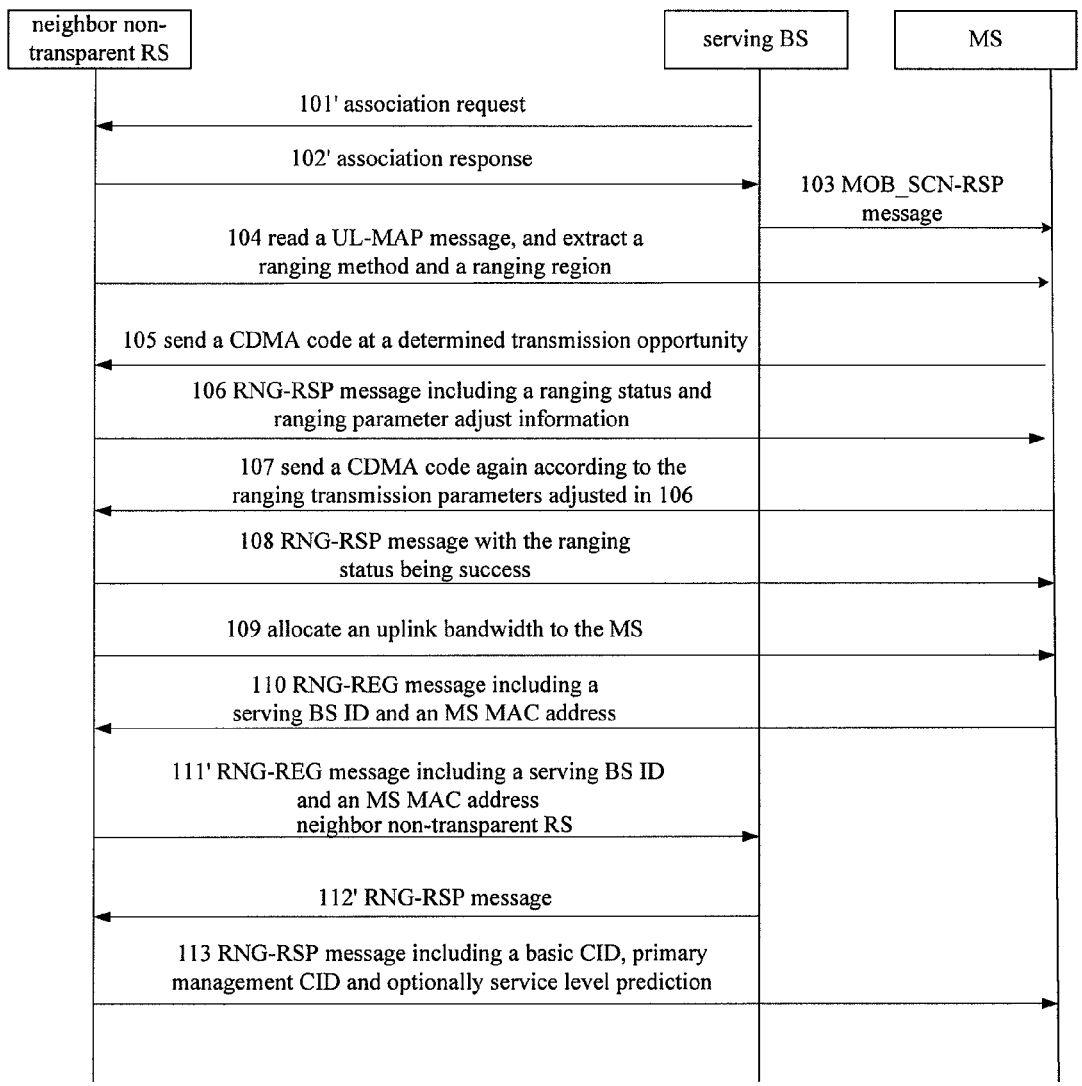

If the associated neighbor station is an RS served by the serving BS, i.e. the serving BS of the associated neighbor station is the serving BS of the MS, the serving BS of the MS sends an association request to the associated neighbor station directly, with reference to 101' in FIG. 1(b) which illustrates a flowchart of another method for Association Level 1 in a relay network in accordance with this embodiment.

In 102, the associated neighbor station sends an association response; the association response includes the MS identifier and the association level allocated to the MS. If the allocated association level is Association Level 1 or Association Level 2, the association response further includes the association parameters including a CDMA code, rendezvous time, ranging region transmission opportunity offset. Corresponding to 101, when the serving BS of the associated neighbor station is a neighbor BS of the MS, the associated neighbor station sends the association response to the neighbor BS of the MS, which is as shown in 102 of FIG. 1(a). After receiving the association response, the neighbor BS of the MS sends the association response to the serving BS of the MS via the backbone network.

If the associated neighbor station is served by the serving BS of the MS, the serving BS of the MS communicates with the associated neighbor station directly, not passing via the backbone network, i.e. the associated neighbor station sends an association response to the serving BS of the MS, which is as shown in 102' in FIG. 1(b).

The serving BS of the MS determines whether the association parameters satisfy the association requirements of the MS or not; if the association parameters satisfy the association requirements of the MS, the association parameter negotiation procedure completes, and the serving BS generates a scanning interval allocation response indicating those association parameters or use them in other operations. If the association parameters do not satisfy the association requirements of the MS, the serving BS may require all neighbor BSs to request parameter negotiation with the associated neighbor stations again, or require the serving BSs of some unsatisfied associated neighbor stations to request parameter negotiation with those associated neighbor stations again.

The above parameter negotiation procedure is continuously performed until the serving BS determines that the allocated association parameters satisfy the association requirements of the MS and the times of parameter negotiation reach a preset value, or the parameter negotiation time exceeds a preset time. If no association request from the serving BS of the associated neighbor station is received again within a period of time, the associated neighbor station determines that the parameter negotiation is success, and prepares performing subsequent operation according to the content of the association response sent by the associated neighbor station at the last time.

When the serving BS receives the association response from the associated neighbor station, the serving BS may send the associated parameters to the MS without determining whether the association parameters satisfy the association requirements of the MS.

In 103, the serving BS sends to the MS an MOB_SCN-RSP message including the association parameters including CDMA code, transmission opportunity offset and rendezvous time.

In 104, the MS synchronizes to the associated neighbor station at the first frame immediately following the rendezvous time, reads an UL-MAP transmitted at the first frame, and extracts the ranging method and the ranging region.

In 105, the MS determines the transmission opportunity of the CDMA code indicated by the serving BS, and sends the CDMA code to the associated neighbor station at the determined transmission opportunity.

If the associated neighbor station sets a dedicated ranging region, the MS determines the transmission opportunity of the CDMA code according to the dedicated ranging region defined by UL-MAP of the associated neighbor station and the offset defined by the transmission opportunity offset included in the MOB_SCN-RSP message from the serving BS.

If the associated neighbor station only sets a regular ranging region, the MS may transmit the CDMA code in the region.

If the MS could not obtain UL_MAP at the first frame immediately following the rendezvous time, it shall abort the Association Level 1 process it is attempting with the current associated neighbor station. The MS may perform the Association Level 0 with the associated neighbor station after it aborts the Association Level 1 process.

In 106, the associated neighbor station sends an RNG-RSP message to the MS directly. The RNG-RSP message includes the ranging parameter adjust information, association parameters, and the ranging status such as success, continue, or abort.

The RNG-RSP message is a broadcast message. The MS determines whether the association parameters included in the RNG-RSP message are the same as the association parameters previously sent by the MS respectively. If the association parameters included in the RNG-RSP message are the same as the association parameters previously sent by the MS respectively, the MS performs an operation according to the ranging status included in the RNG-RSP message. If the ranging status is continue, proceeds to 107.

In 107, the MS adjusts the ranging parameters according to the ranging parameter adjust information, and continues the ranging process until the associated neighbor station receives a CDMA code which requires no corrections. If the associated neighbor station determines that the received CDMA code requires no corrections, the associated neighbor station performs an operation in 108. If the associated neighbor station determines that the ranging status is abort, the ranging process is terminated or another ranging process is performed, e.g. the process returns to 104 or 105.

In 108, the associated neighbor station sends an RNG-RSP message with the ranging status being success to the MS. The operation in 108 is optional.

In 109, the associated neighbor station allocates an uplink bandwidth to the MS using an UL-MAP.

If it is the case that the operation in 108 is included in an embodiment, the sequence of 108 and 109 is not fixed, and it can be determined by the system according to actual situation.

In 110, the MS receives the UL bandwidth and optionally an RNG-RSP message with the ranging status being success, and sends, in the UL bandwidth, an RNG-REG message including the serving BS identifier (ID) and optionally including Requested DL Burst Profile and/or MS MAC address to the associated neighbor station.

In 111, after the associated neighbor station receives the RNG-REQ message, the associated neighbor station sends the RNG-REQ message to the serving BS of the associated neighbor station, or the associated neighbor station modifies the RNG-REQ message, such as deleting Requested Downlink Burst Profile from the RNG-REQ message, and send the RNG-REQ message modified to the serving BS of the associated neighbor station.

If the associated neighbor station receives multiple RNG-REQ messages with the same serving BS ID from several MSs, the associated neighbor station may further aggregate information in all RNG-REQ messages into a RNG-REQ message, and send the RNG-REQ message to the serving BS of the associated neighbor station for those MSs.

The serving BS of the associated neighbor station in FIG. 1(a) is a neighbor BS of the MS. If the serving BS of the associated neighbor station is a serving BS of the MS, the 111 is replaced with 111' as shown in FIG. 1(b).

In 112, the serving BS of the associated neighbor station receives the RNG-REQ message, generates an RNG-RSP message including the basic CID, the primary management CID allocated to the MS, and optionally the service level prediction parameter, and sends the RNG-RSP message to the associated neighbor station.

The serving BS of the associated neighbor station in FIG. 1(a) is a neighbor BS of MS. If the serving BS of the associated neighbor station is a serving BS of MS, 112 is replaced with 112' as shown in FIG. 1(b).

The serving BS of the associated neighbor station may be a serving BS or a neighbor BS of the MS. In one association process, there may be multiple associated neighbor stations; some of the multiple associated neighbor stations may be served by the neighbor BS of the MS and the rest associated neighbor stations may be served by the serving BS of the MS.

If the associated neighbor station performs the association with multiple MSs, the associated neighbor station divides the association response information of multiple MSs into response information corresponding to each MS.

In 113, the associated neighbor station sends the response information related to the MS included in the RNG-RSP message to the MS.

Figure 2:
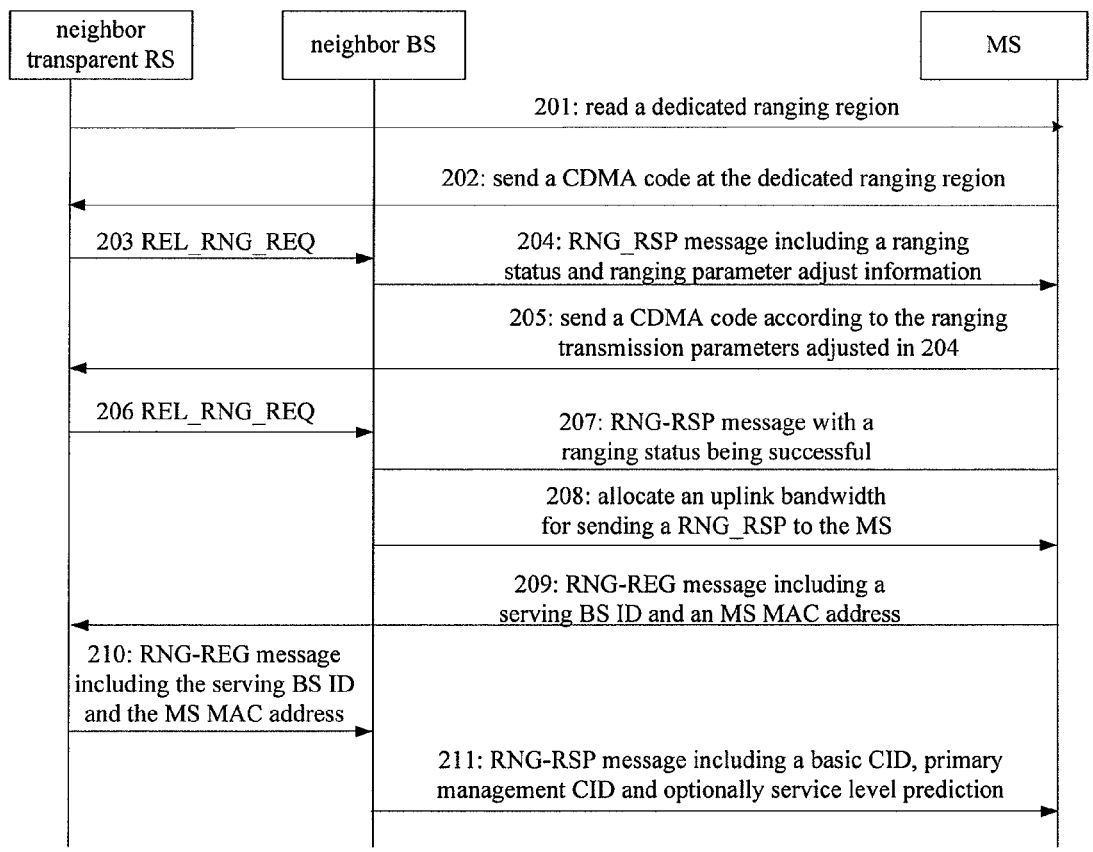
FIG. 2 illustrates a flowchart of a method for Association Level 1 in a relay network in accordance with Embodiment 2 of the present invention.

FIG. 2 is a flowchart of a method for Association Level 1 in a relay network in accordance with another embodiment of the present invention. In this procedure, the associated neighbor station is a transparent RS. If the transparent RS is in the current cell, the association parameter negotiation procedure is not needed. If the transparent RS is not in the current cell, the association parameter negotiation procedure which is similar to that in the prior art may be used, i.e., the serving BS of an MS negotiates the association parameters provided to the MS with the serving BS of the associated neighbor station via the backbone network. In this embodiment, the serving BS of the associated neighbor station is a neighbor BS of the MS. Association Level 1 after association parameter negotiation is described as follows.

201 and 202 are similar to 104 and 105 in FIG. 1, and will not be detailed.

In 203, after receiving a CDMA code from the MS, the associated neighbor station sends an REL_RNG-REQ message to the neighbor BS, reporting the receiving information of the CDMA code, e.g., the power, timing and frequency to be adjusted, signal quality such as CINR, and the ranging status such as success, continuing, or abort.

In 204, the neighbor BS determines one communication path between the MS and the neighbor BS according to the REL_RNG-REQ messages from the associated RSs and/or the receiving information of the CDMA code learned by the neighbor BS directly. In this case, the neighbor BS generates an RNG_RSP message according to the REL_RNG-REQ message from the associated RS on the determined communication path or according to the receiving information of the CDMA code learned by the neighbor BS directly, and sends the RNG_RSP message to the MS.

The RNG_RSP message includes the ranging status, association parameters and the ranging parameter adjust information. The RNG-RSP message is a broadcast message. The MS determines whether the association parameters included in the RNG-RSP message are the same as the association parameters previously sent by the MS respectively. If the association parameters included in the RNG-RSP message are the same as the association parameters sent by the MS respectively, the MS performs an operation according to the ranging status included in the RNG-RSP message. If the ranging status is continue, proceeds to 205.

In 205, the MS adjusts the ranging transmission parameters according to the ranging parameter adjust information, and continue the ranging process until the associated neighbor station receives a CDMA code which requires no corrections.

In 206, the associated neighbor station on the determined communication path sends an REL_RNG_REQ message to the neighbor BS.

In 207, when the neighbor BS receives an REL_RNG-REQ message indicating that the CDMA code received by the associated neighbor station requires no correction, the neighbor BS sends a RNG-RSP message with the ranging status being success to the MS, and proceeds to 208. In 207, the neighbor BS may not send a RNG-RSP message with the ranging status being success to the MS. If the neighbor BS determines that the ranging status is abort and notifies the MS of the abort ranging status using the RNG-RSP message, the ranging procedure is terminated or the MS performs the ranging process again, e.g. return to 201 or 202.

In 208, the neighbor BS allocates an uplink (UL) bandwidth to the MS via an UL-MAP.

If it is the case that the operation in 207 is included in an embodiment and the neighbor BS determines that the ranging status is success, the sequence of 207 and 208 may be determined by the system according to actual conditions.

In 209, after receiving the UL bandwidth, the MS transmits, in the allocated UL bandwidth, an RNG-REG message including the serving BS ID and the MS MAC address to the associated neighbor station.

In 210, the associated neighbor station sends the RNG-REQ message received from the MS to the neighbor BS.

In 211, after receiving the RNG-REQ message, the neighbor BS includes the basic CID and the primary management CID allocated to the MS, and optionally the service level prediction in the RNG-RSP message, and sends the RNG-RSP message to the MS.

In the embodiment as shown in FIG. 2, if the transparent RS is in the serving cell, association parameter negotiation is not needed; in this case, the serving BS of the associated neighbor station is a serving BS of the MS; the neighbor BS in the embodiment as shown in FIG. 2 is replaced by a serving BS, and the implementation is similar.

It should be noted that, multiple associated neighbor stations may be involved in an association procedure; some associated neighbor stations may be served by the neighbor BSs of the MS, and the rest may be served by the serving BS of the MS. Therefore, in practice, the association procedure may be performed according to the corresponding method.

Association Level 2 is similar to Association Level 1, and the difference is that, in Association Level 2, after sending a CDMA code to the associated neighbor station, the MS receives an association result report including the ranging parameter adjust information, ranging status and service level prediction from the serving BS of the MS or the access RS of the MS, instead of receiving RNG-RSP messages from the corresponding associated neighbor stations.

The Association Level 2 method according to an embodiment of the present invention is as follows.

An associated neighbor station receives a CDMA code from an MS, sends ranging report to a serving BS of the associated neighbor station, and the ranging report includes the ranging parameter adjust information and ranging status;

if the serving BS of the associated neighbor station is a serving BS of the MS, the serving BS of the associated neighbor station sends the ranging report to the MS; if the serving BS of the associated neighbor station is a neighbor BS of the MS, the serving BS of the associated neighbor station sends the ranging report to the serving BS of the MS via the backbone network; the serving BS of the MS sends the ranging report information received from the serving BS of the associated neighbor station to the MS.

If the associated neighbor station is a non-transparent RS, before the associated neighbor station receives a CDMA code, the method further includes the following.

The serving BS of the associated neighbor station sends an association request to the associated neighbor station; the association request includes an MS identifier and a requested association level; the associated neighbor station sends an association response to the serving BS of the associated neighbor station; the association response includes the MS identifier and the association level allocated to the MS; if the association level is Association Level 1 or Association Level 2, the association response further includes allocated association parameters including CDMA code, rendezvous time, transmission opportunity offset; if the serving BS of the associated neighbor station is a neighbor BS of the MS, the serving BS of the associated neighbor station receives the association response, and sends the association response to the serving BS of the MS; the serving BS of the MS sends the association parameters received from the serving BS of the associated neighbor station to the MS. If the serving BS of the associated neighbor station is the serving BS of the MS, the serving BS of the associated neighbor station communicates with the associated neighbor station directly, i.e., the serving BS of the associated neighbor station receives the association parameters from the associated neighbor station, generates a scanning interval allocation response message including the association parameters, and sends the scanning interval allocation response message to the MS.

Figure 3:
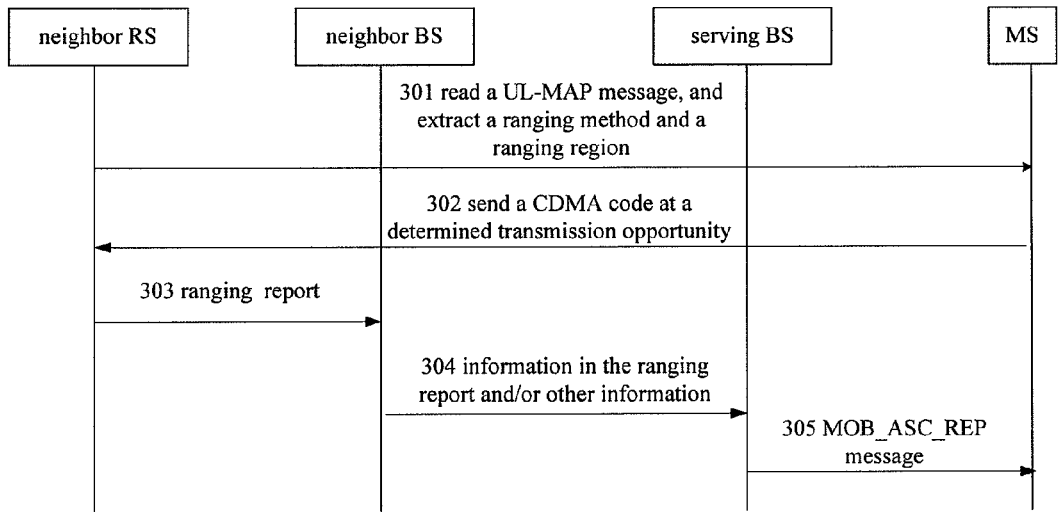
FIG. 3(a) illustrates a flowchart of a method for Association Level 2 in a relay network in accordance with Embodiment 3 of the present invention.
Figure 3:
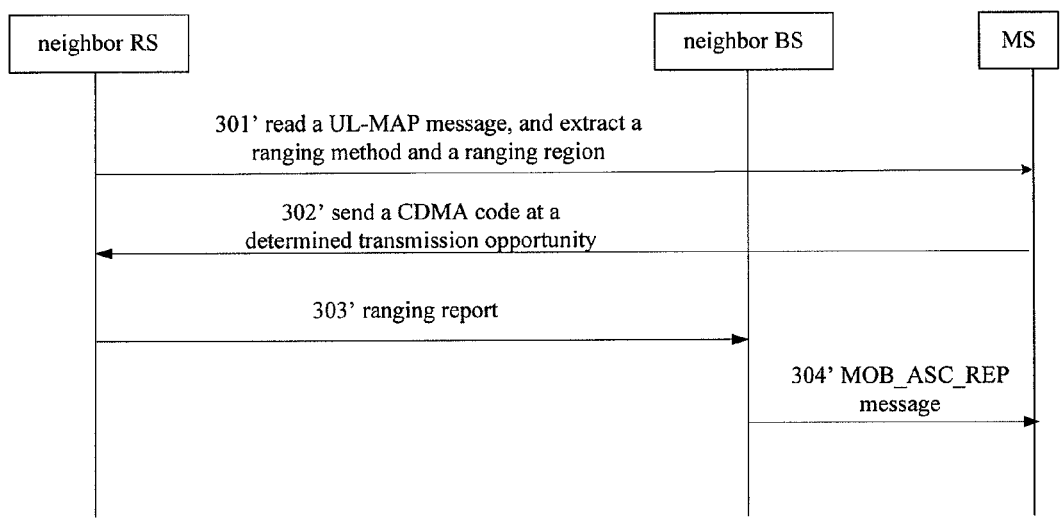

FIG. 3(*a*) illustrates a flowchart of a method for Association Level 2 in a relay network in accordance with another embodiment of the present invention. In this embodiment, the associated neighbor station is an RS, and the RS may be a transparent RS or a non-transparent RS. If the associated neighbor station is the non-transparent RS, association parameter negotiation procedure in Association Level 2 in this embodiment is similar to the association parameter negotiation procedure in Association Level 1 as shown in FIG. 2, which is illustrated by 101-103 in FIG. 1. If the associated neighbor station is the transparent RS and the transparent RS is in the serving cell, the parameter negotiation is not needed; if the transparent RS is not in the serving cell, i.e. the serving BS of the transparent RS is a neighbor BS of an MS, parameter negotiation in Association Level 2 in this embodiment is similar to the parameter negotiation in the prior art, i.e., the serving BS of MS negotiates the association parameters provided to the MS with the serving BS of the associated neighbor station via the backbone network.

In FIG. 3(*a*), the serving BS of the associated neighbor station is a neighbor BS of the MS; the procedure after the parameter negotiation is as follows.

301 and 302 are similar to 104 and 105, and will not be detailed.

In 303, after sending a CDMA code to the associated neighbor station, the MS communicates with the serving BS of the MS. The associated neighbor station sends a ranging report to a serving BS of the associated neighbor station; the ranging report includes ranging status and ranging parameter adjust information such as power, timing and frequency and optionally includes association parameters or MS identifier (e.g. MS MAC Address).

If the associated neighbor station is an RS served by the serving BS of the MS, i.e. the serving BS of the associated neighbor station is the serving BS of the MS, the serving BS of the MS communicates with the associated neighbor station directly, without passing through the backbone network, and the specific implementation is as shown in 303' and 304' in FIG. 3(*b*).

In 304, the serving BS of the associated neighbor station sends some information in the ranging report and/or other information to the serving BS of the MS via the backbone network.

In 305, the serving BS of MS aggregates information from one or multiple associated neighbor stations into an association result report, and sends the association result report to the MS.

In 305, the serving BS of the MS may send the association result report to the MS directly or via the access RS of the MS.

If the associated neighbor station is an RS served by the serving BS of the MS, i.e. the serving BS of the associated neighbor station is the serving BS of the MS, the serving BS of the MS communicates with the associated neighbor station directly without passing through the backbone network, which is as shown in 303' and 304' in FIG. 3(*b*).

Figure 4:
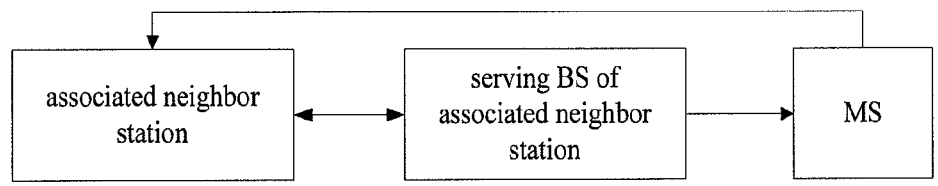
FIG. 4 illustrates the structure of a system for Association Level 1 in a relay network in accordance with an embodiment of the present invention.

According to an embodiment of the present invention, a system for Association Level 1 in a relay network is provided. With reference to FIG. 4, the system for Association Level 1 includes an associated neighbor station, a serving BS of the associated neighbor station and an MS; the associated neighbor station may be an RS.

The associated neighbor station is configured to receive a ranging request from an MS, and send the ranging request to the serving BS of the associated neighbor station.

The serving BS of the associated neighbor station is configured to receive the ranging request from the associated neighbor station, and send a ranging response to the MS or the associated neighbor station.

The MS is configured to send the ranging request to the associated neighbor station, and receive the ranging response from the serving BS of the associated neighbor station or the associated neighbor station The serving BS of the associated neighbor station may be a serving BS of the MS or a neighbor BS of the MS.

The MS includes a ranging message transceiver unit and an association parameter receiving unit.

The ranging message transceiver unit is configured to send the ranging request to the associated neighbor station, and receive the ranging response from the serving BS of the associated neighbor station or the associated neighbor station.

The association parameter receiving unit is configured to receive the association parameters negotiated from the serving BS of the MS.

Figure 5:
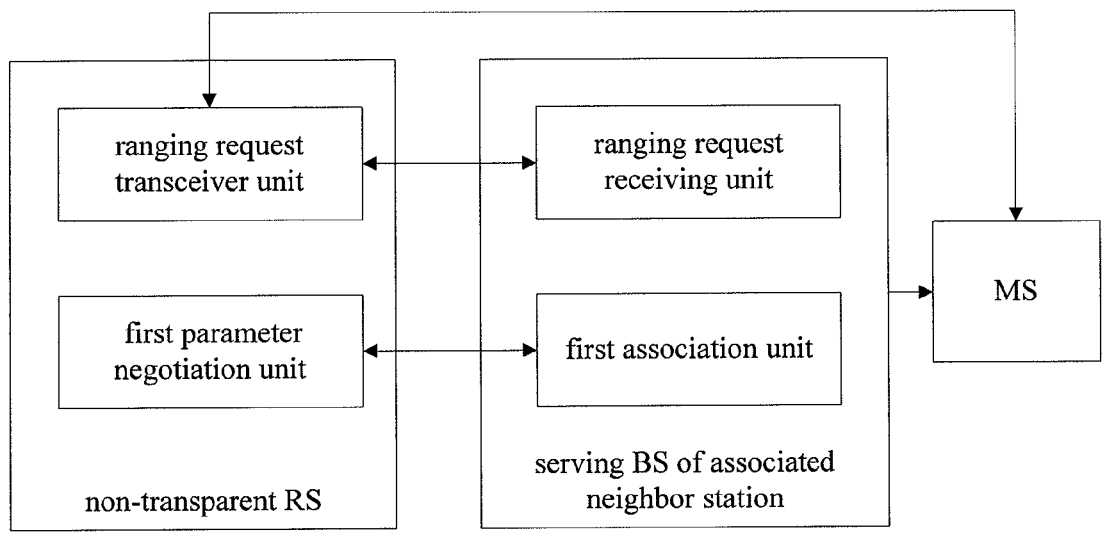
FIG. 5 illustrates the structure of a system as shown in FIG. 4 when the associated neighbor station is a non-transparent RS.

If the associated neighbor station is a non-transparent RS, with reference to FIG. 5, the non-transparent RS includes a ranging request transceiver unit and a first parameter negotiation unit.

The ranging request transceiver unit is configured to receive the ranging request from the MS, and send the ranging request to the serving BS of the associated neighbor station, receive the ranging response from the serving BS of the associated neighbor station, and send the ranging response to the MS.

The first parameter negotiation unit is configured to receive an association request from the serving BS of the associated neighbor station, and send an association response to the serving BS of the associated neighbor station.

The serving BS of the associated neighbor station includes: a ranging request receiving unit and a first association request unit.

The ranging request receiving unit is configured to receive the ranging request from the associated neighbor station, and send the ranging response to the associated neighbor station.

The first association unit is configured to send the association request to the associated neighbor station, receive the association response from the associated neighbor station, and send the association response to the serving BS of the MS, or send the negotiated association parameters to the MS directly.

It should be noted that, if the serving BS of the associated neighbor station is a serving BS of the MS, the association request unit may directly send association parameters negotiated to the MS; if the serving BS of the associated neighbor station is a neighbor BS of the MS, the serving BS of the associated neighbor station needs to first negotiate the association parameters with the associated neighbor station and send associated parameters negotiated to the serving BS of the MS via the backbone network, and the association parameters negotiated are sent to the MS by the serving BS of the MS.

Figure 6:
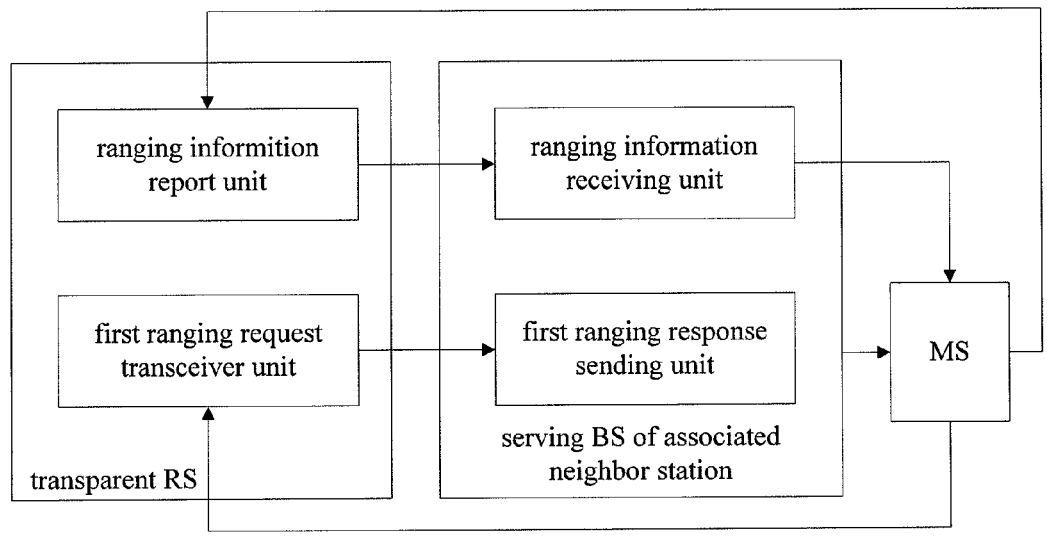
FIG. 6 illustrates the structure of the system as shown in FIG. 4 when the associated neighbor station is a transparent RS.

If the associated neighbor station is a transparent RS, with reference to FIG. 6, the transparent RS includes a ranging information report unit and a first ranging request transceiver unit.

The ranging information report unit is configured to receive a CDMA code from an MS, and report the ranging information of the CDMA code to the serving BS of the RS.

The first ranging request transceiver unit is configured to receive the ranging request from the MS, and send the ranging request to the serving BS of the RS.

The serving BS of the RS includes: a ranging information receiving unit and a first ranging responding unit.

The ranging information receiving unit is configured to receive the ranging information of the CDMA code from the associated neighbor station, determine a communication path according to the ranging information of the CDMA code received by the ranging information receiving unit or according to the ranging information of the CDMA code learned by the neighbor BS, generate a ranging response according to the the ranging information of the CDMA code on the communication path and/or according to the ranging information of the CDMA code learned by the neighbor BS, and send the ranging response to the MS; if the CDMA code received needs no corrections, allocate an uplink (UL) bandwidth to the MS for the MS to send the ranging request.

The first ranging responding unit is configured to receive the ranging request from the associated neighbor station, and send the ranging response to the MS.

Figure 7:
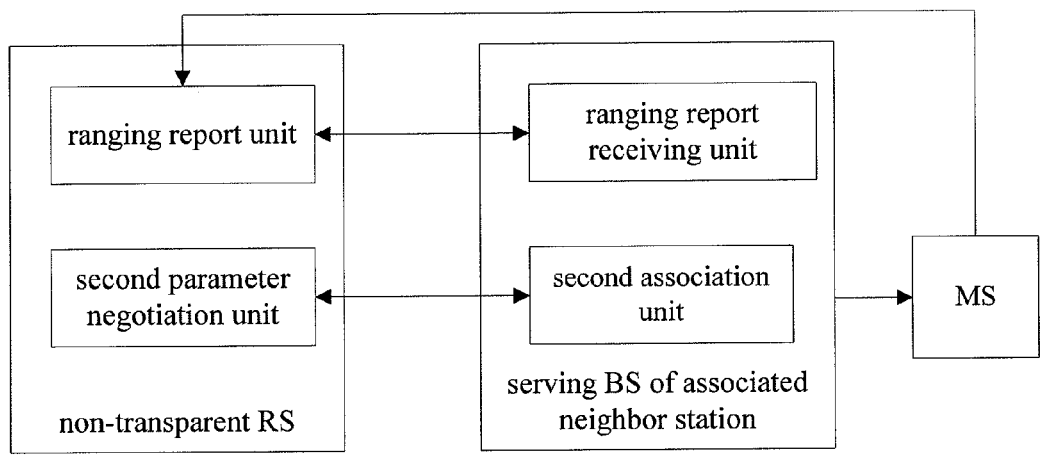
FIG. 7 illustrates the structure of a system for Association Level 2 in a relay network in accordance with an embodiment of the present invention.

According to an embodiment of the present invention, a system for Association Level 2 in a relay network is provided. With reference to FIG. 7, the system for Association Level 2 in a relay network includes an associated neighbor station, a serving BS of the associated neighbor station and an MS; and the associated neighbor station may be an RS.

The associated neighbor station is configured to receive a CDMA code from the MS, send a ranging report to the serving BS of the associated neighbor station; and the ranging report includes ranging parameter adjust information and a ranging status and optionally includes association parameters or MS identifier (e.g. MS MAC Address).

The serving BS of the associated neighbor station is configured to send the ranging report to the MS, if the serving BS of the associated neighbor station is a serving BS of the MS; and the serving BS of the associated neighbor station is configured to send the ranging report to the serving BS of the MS, and the ranging report is sent to the MS by the serving BS of the MS, if the serving BS of the associated neighbor station is a neighbor BS of the MS.

The MS is configured to send the CDMA code to the associated neighbor station, and receive the ranging report from the serving BS of the MS.

The serving BS of the associated neighbor station may be the serving BS of the MS or the neighbor BS of the MS.

If the associated neighbor station is a non-transparent RS; the non-transparent RS includes a ranging report unit and a second parameter negotiation unit.

The ranging report unit is configured to receive the CDMA code from the MS, and send the ranging report to the serving BS of the MS.

The second parameter negotiation unit is configured to receive an association request sent by the serving BS of the RS, and send an association response to the serving BS of the RS.

In this case, the serving BS of the associated neighbor station, i.e., the serving BS of the non-transparent RS includes a ranging report receiving unit and a second association unit.

The ranging report receiving unit is configured to receive the ranging report from the associated neighbor station and send the ranging report to the MS, or send the ranging report to the serving BS of the MS.

The second association unit is configured to send an association request to the associated neighbor station, receive an association response from the associated neighbor station, and send the association parameters negotiated to the serving BS of the MS, or send the association parameters negotiated to the MS directly.

As can be seen from the above embodiments, the method, system and relay station for association in a relay network according to the embodiments of the present invention can support Association Level 1 or Association Level 2 when the associated neighbor station is an RS. In addition, if the associated neighbor station is a non-transparent RS, the problem that Association Level 1 and Association Level 2 can not be implemented because the serving BS of the associated RS can not acquire the association parameters allocated by the associated RS when the associated RS allocates ranging parameters to the MS independently is solved by adding an association parameter negotiation process between the non-transparent RS and the serving BS of the non-transparent RS.

An embodiment of the invention provides a system and BSs of association.

A system of negotiation for association in a relay network is provided. The system includes an MS, a neighbor station and a serving Base Station (BS) of the neighbor station.

The neighbor station is configured to receive an association request from the serving BS of the neighbor station, and send an association response to the serving BS of the neighbor station.

The serving BS of the neighbor station is configured to send the association request to the neighbor station and receive the association response from the neighbor station.

The association request includes an MS identifier and a requested association level; and the association response includes the MS identifier and an association level allocated to the MS; if the association level allocated to the MS is one of an Association Level 1 and an Association Level 2, the association response further includes association parameters including a CDMA code, a rendezvous time, a ranging region transmission opportunity offset.

Figure 8:
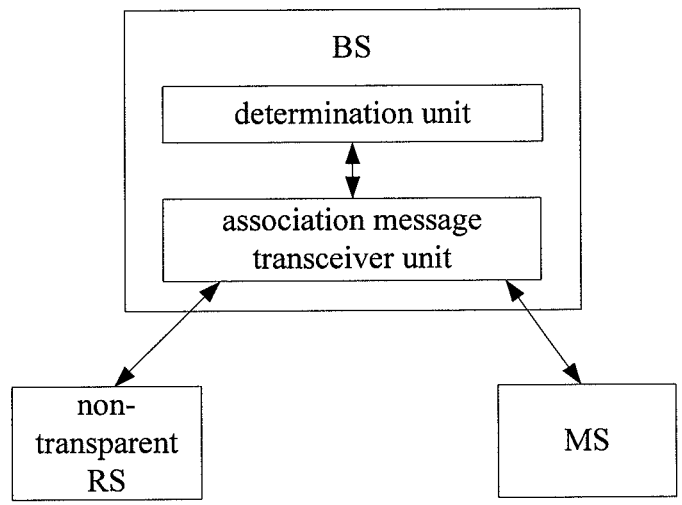

If the serving BS of the associated neighbor station is a serving BS of the MS, with reference to FIG. 8, the serving BS of the associated neighbor is further configured to send the association parameters included in the association response to the MS.

Figure 9:
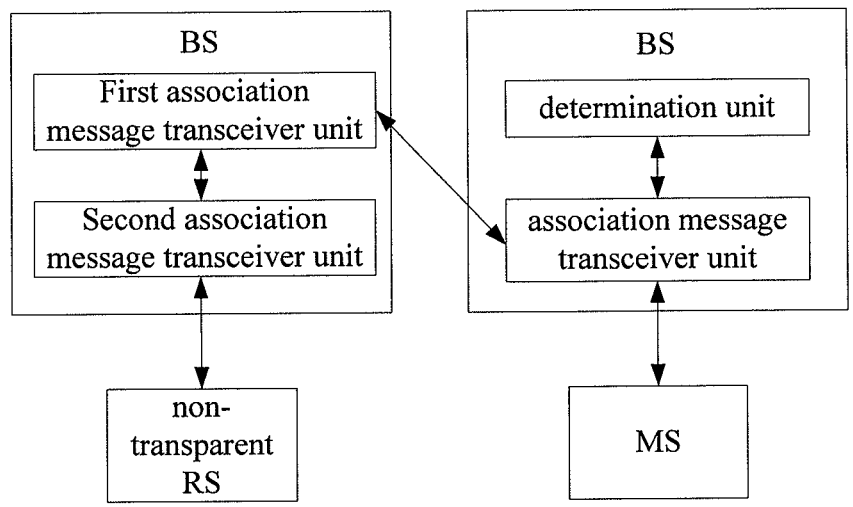

If the serving BS of the neighbor station is a neighbor BS of the MS; with reference to FIG. 9, the system further includes a serving BS of the MS, and the serving BS of the neighbor station is further configured to receive the association request from the serving BS of the MS, and send the association parameters included in the association response to the serving BS of the MS, and the serving BS of the MS is configured to send the association parameters to the MS.

The serving BS of the MS may determine whether the association parameters meet the requirements of the MS. If the association parameters meet the requirement of the MS, the serving BS of the MS sends the association parameters to the MS; if the association parameters do not meet the requirements of the MS, the serving BS of the MS sends the association request again.

A BS for association is provided. The BS is a serving BS of an MS and a neighbor station of the MS. The BS includes an association message transceiver unit which is configured to send an association request to the neighbor station, receive an association response from the neighbor station, and send association parameters included in the association response to the MS. The BS may also include a determination unit which is configured to determine whether the association parameters meet the requirements of the MS. If the association parameters meet the requirements of the MS, the determination unit notifies the association message transceiver unit to send the association parameters to the MS; if the association parameters do not meet the requirements of the MS, the determination unit notifies the association message transceiver unit to send the association request again.

Another BS for association is provided. The BS is a serving BS of an MS and is not a serving BS of a neighbor station of the MS. The BS includes an association message transceiver unit which is configured to send an association request to a serving BS of the neighbor station, and receive an association response from the serving BS of the neighbor station, and send association parameters included in the association response to the MS. The BS may also include a determination unit which is configured to determine whether the association parameters meet the requirements of the MS. If the association parameters meet the requirements of the MS, the determination unit notifies the association message transceiver unit to send the association parameters to the MS; if the association parameters do not meet the requirements of the MS, the determination unit notifies the association message transceiver unit to send the association request again.

Another BS for association is provided as well. The BS is a neighbor BS of an MS and is a serving BS of a neighbor station of the MS. The BS includes a first association message transceiver unit which is configured to receive an association request from a serving BS of the MS, and send an association response to the serving BS of the MS. The BS also includes a second association message transceiver unit which is configured to send the association request from the first association message transceiver unit to the neighbor station, and receive the association response from the neighbor station and send the association response to the first association message transceiver unit.

For the system and the BSs of association in this embodiment, the neighbor station recited is a non-transparent RS.

The above is the description of the detailed embodiments of the present invention. The method, the system and the device of the present invention can be modified appropriately during a specific implementation, to meet the specific requirements of the specific cases. It is thereby understood that the detailed embodiments according to the present invention are just demonstrative of, but not limitative to the protection scope of the present invention.

What is claimed is:

1. A method for association in a relay network, comprising;
   receiving, by a serving Base Station (BS) of an associated neighbor station, a ranging request from the associated neighbor station, wherein the ranging request is received by the associated neighbor station from a Mobile Station (MS);
   sending, by the serving BS of the associated neighbor station, a ranging response to one of the MS and the associated neighbor station in response to the ranging request;
   wherein the associated neighbor station is a non-transparent Relay Station (RS),
   wherein the sending a ranging response to the MS comprises:
      sending, by the serving BS of the associated neighbor station, the ranging response to the associated neighbor station; and
      sending, by the associated neighbor station, the ranging response to the MS,
   wherein the serving BS of the associated neighbor station is a neighbor BS of the MS; and wherein the method for association in a relay network further comprises:
  negotiating association parameters between the associated neighbor station and the neighbor BS of the MS;
  sending, by the neighbor BS of the MS, the association parameters negotiated to a serving BS of the MS;
  sending, by the serving BS of the MS, the association parameters negotiated to the MS;
  sending, by the MS, a CDMA code included in the association parameters to the associated neighbor station;
  receiving, by the associated neighbor station, the CDMA code that requires no corrections from the MS;
  allocating, by the associated neighbor station, an uplink bandwidth to the MS for the MS to send the ranging request; and
  sending, by the MS, the ranging request to the associated neighbor station in response to the uplink bandwidth.

2. The method of claim 1, wherein negotiating association parameters comprises:
  sending, by the neighbor BS of the MS, an association request to the associated neighbor station; and
  sending, by the associated neighbor station, an association response to the neighbor BS of the MS.

3. The method of claim 2, wherein the association request includes an MS identifier and a requested association level; the association response includes the MS identifier, an association level allocated to the MS, and the association parameters including a CDMA code, a rendezvous time and a transmission opportunity offset.

4. A method for association in a relay network, comprising:
  receiving, by a serving Base Station (BS) of an associated neighbor station, a ranging request from the associated neighbor station, wherein the ranging request is received by the associated neighbor station from a Mobile Station (MS);
  sending, by the serving BS of the associated neighbor station, a ranging response to one of the MS and the associated neighbor station in response to the ranging request;
  wherein the associated neighbor station is a non-transparent Relay Station (RS),
  wherein the sending a ranging response to the MS comprises:
    sending, by the serving BS of the associated neighbor station, the ranging response to the associated neighbor station; and
    sending, by the associated neighbor station, the ranging response to the MS,
  wherein the serving BS of the associated neighbor station is a serving BS of the MS, and
  wherein the method for association in a relay network further comprises:
    negotiating association parameters between the associated neighbor station and the serving BS of the MS;
    sending, by the serving BS of the MS, the association parameters negotiated to the MS;
    sending, by the MS, a CDMA code included in the association parameters negotiated to the associated neighbor station;
    receiving, by the associated neighbor station, the CDMA code that requires no corrections from the MS;
    allocating, by the associated neighbor station, an uplink bandwidth to the MS for the MS to send the ranging request; and
    sending, by the MS, the ranging request to the associated neighbor station in response to the uplink bandwidth.

5. The method of claim 4, wherein negotiating the association parameters between the associated neighbor station and the serving BS of the MS comprises:
  sending, by the serving BS of the MS, an association request to the associated neighbor station; and
  sending, by the associated neighbor station, an association response to the serving BS of the MS.

6. A method for association in a relay network, comprising:
  receiving, by a serving Base Station (BS) of an associated neighbor station, a ranging request from the associated neighbor station, wherein the ranging request is received by the associated neighbor station from a Mobile Station (MS);
  sending, by the serving BS of the associated neighbor station, a ranging response to one of the MS and the associated neighbor station in response to the ranging request;
  wherein the associated neighbor station is a transparent Relay Station (RS),
  wherein the sending a ranging response to the MS comprises:
    sending, by the serving BS of the associated neighbor station, the ranging response to the MS,
    wherein the serving BS of the associated neighbor station is a neighbor BS of the MS, and
  wherein the method for association in a relay network further comprises:
    negotiating association parameters allocated to the MS between a serving BS of the MS and the serving BS of the associated neighbor station via a backbone network;
    sending, by the serving BS of the MS, the association parameters negotiated to the MS;
    sending, by the MS, a CDMA code included in the association parameters negotiated to the associated neighbor station;
    receiving, by the associated neighbor station, the CDMA code from the MS, and reporting, by the associated neighbor station, ranging information of the CDMA code to the serving BS of the associated neighbor station;
    determining, by the serving BS of the associated neighbor station, a communication path between the serving BS of the associated neighbor station and the MS according to the ranging information of the CDMA code from the associated neighbor station or ranging information of the CDMA code learned by the serving BS of the associated neighbor station, generating a ranging response according to the ranging information of the CDMA code from the associated neighbor station on the communication path or according to the ranging information of the CDMA code learned by the serving BS of the associated neighbor station, and sending the ranging response to the MS;
    allocating, by the serving BS of the associated neighbor station, an uplink bandwidth to the MS for the MS to send the ranging request; and
    sending, by the MS, the ranging request to the associated neighbor station in response to the uplink bandwidth.

7. A method for association in a relay network, comprising:
  receiving, by a serving Base Station (BS) of an associated neighbor station, a ranging report from the associated neighbor station, after the associated neighbor station receiving a CDMA code from a Mobile Station (MS);

if the serving BS of the associated neighbor station is a serving BS of the MS sending, by the serving BS of the associated neighbor station, the ranging report to the MS;

if the serving BS of the associated neighbor station is a neighbor BS of the MS, sending, by the serving BS of the associated neighbor station, the ranging report to the serving BS of the MS by which the ranging report is sent to the MS, wherein the associated neighbor station is a non-transparent Relay Station (RS), and wherein the method for association in a relay network further comprises:

sending, by the serving BS of the associated neighbor station, an association request to the associated neighbor station;

sending, by the associated neighbor station, an association response to the serving BS of the associated neighbor station;

receiving, by the serving BS of the associated neighbor station, the association response, and if the serving BS of the associated neighbor station is the serving BS of the MS, sending, by the serving BS of the associated neighbor station, association parameters included in the association response to the MS;

if the serving BS of the associated neighbor station is the neighbor BS of the MS, sending, by the serving BS of the associated neighbor station, the association parameters to the serving BS of the MS; and sending, by the serving BS of the MS, the association parameters to the MS.

8. The method of claim 7, wherein the association request includes an MS identifier and a requested association level; and the association response includes the MS identifier and an association level allocated to the MS, and the association parameters includes a CDMA code, a rendezvous time, a ranging region transmission opportunity offset.

9. The method of claim 8, further comprising:

before sending the association parameters to the MS, sending, by the serving BS of the MS, the association parameters to the MS if determining that the association parameters satisfy the association requirements of the MS.

10. The method of claim 9, further comprising:

requiring, by the serving BS of the MS, the serving BS of the associated neighbor station to send the association request to the associated neighbor station again, if the serving BS of the MS determines that the association parameters included in the association response do not satisfy the association requirements of the MS.

11. A system for association in a relay network, comprising:

an associated neighbor station, configured to receive a ranging request, and send the ranging request; wherein the associated neighbor station is a Relay Station (RS);

a serving Base Station (BS) of the associated neighbor station, configured to receive the ranging request from the associated neighbor station and send a ranging response to a Mobile Station (MS) or the associated neighbor station, wherein the MS is configured to send the ranging request to the associated neighbor station, and receive ranging response from the serving BS of the associated neighbor station or the associated neighbor station, wherein the associated neighbor station is a transparent RS comprising:

a ranging information report unit, configured to receive a CDMA code from the MS, and report the ranging information of the CDMA code to the serving BS of the associated neighbor station; and a first ranging request transceiver unit, configured to receive the ranging request from and request to the serving BS of the associated neighbor station, and wherein the serving BS of the associated neighbor station comprises:

a ranging information receiving unit, configured to receive the ranging information of the CDMA code from the associated neighbor station, determine a communication path according to the ranging information of the CDMA code from the associated neighbor station or according to the ranging information of the CDMA code learned by the neighbor BS, generate a ranging response according to the ranging information of the CDMA code from the associated neighbor station on the communication path or according to the ranging information of the CDMA code learned by the neighbor BS, and send the ranging response to the MS and allocate an uplink bandwidth to the MS for the MS to send the ranging request; and a first ranging response sending unit, configured to receive the ranging request from the associated neighbor station, and send the ranging response to the MS.

12. A system for association in a relay network, comprising:

an associated neighbor station, configured to receive a CDMA code, and send a ranging report; wherein the associated neighbor station is a Relay Station (RS);

a serving Base Station (BS) of the associated neighbor station, configured to receive the ranging report from the associated neighbor station, send the ranging report to a Mobile Station (MS) if the serving BS of the associated neighbor station is a serving BS of the MS, and send the ranging report to the MS via the serving BS of the MS if the serving BS of the associated neighbor station is a neighbor BS of the MS; and the MS, configured to send the CDMA code to the associated neighbor station, and receive the ranging report sent by the serving BS of the MS, wherein the serving BS of the associated neighbor station comprises:

a ranging report receiving unit, configured to receive the ranging report from the associated neighbor station, send the ranging resort to the MS if the serving BS of the associated neighbor station is the serving BS of the MS, and send the ranging report to the MS via the serving BS of the MS if the serving BS of the associated neighbor station is the neighbor BS of the MS; and an association unit, configured to send the association request to the associated neighbor station, receive the association response from the associated neighbor station, and send association parameters included in the association response to the serving BS of the MS, or send the association parameters included in the association response to the MS directly.

13. The system of claim 12, wherein the associated neighbor station is a non-transparent RS, comprising:

a ranging report unit, configured to receive the CDMA code from the MS, and send the ranging report to the serving BS of the associated neighbor station; and a parameter negotiation unit, configured to receive an association request sent by the serving BS of the associated neighbor station, and return an association response to the serving BS of the associated neighbor station.

* * * * *